Feb. 14, 1933.   G. H. TABER   1,897,538
VEHICLE SPRING CONTROLLING MEANS
Filed Feb. 17, 1930   2 Sheets-Sheet 1
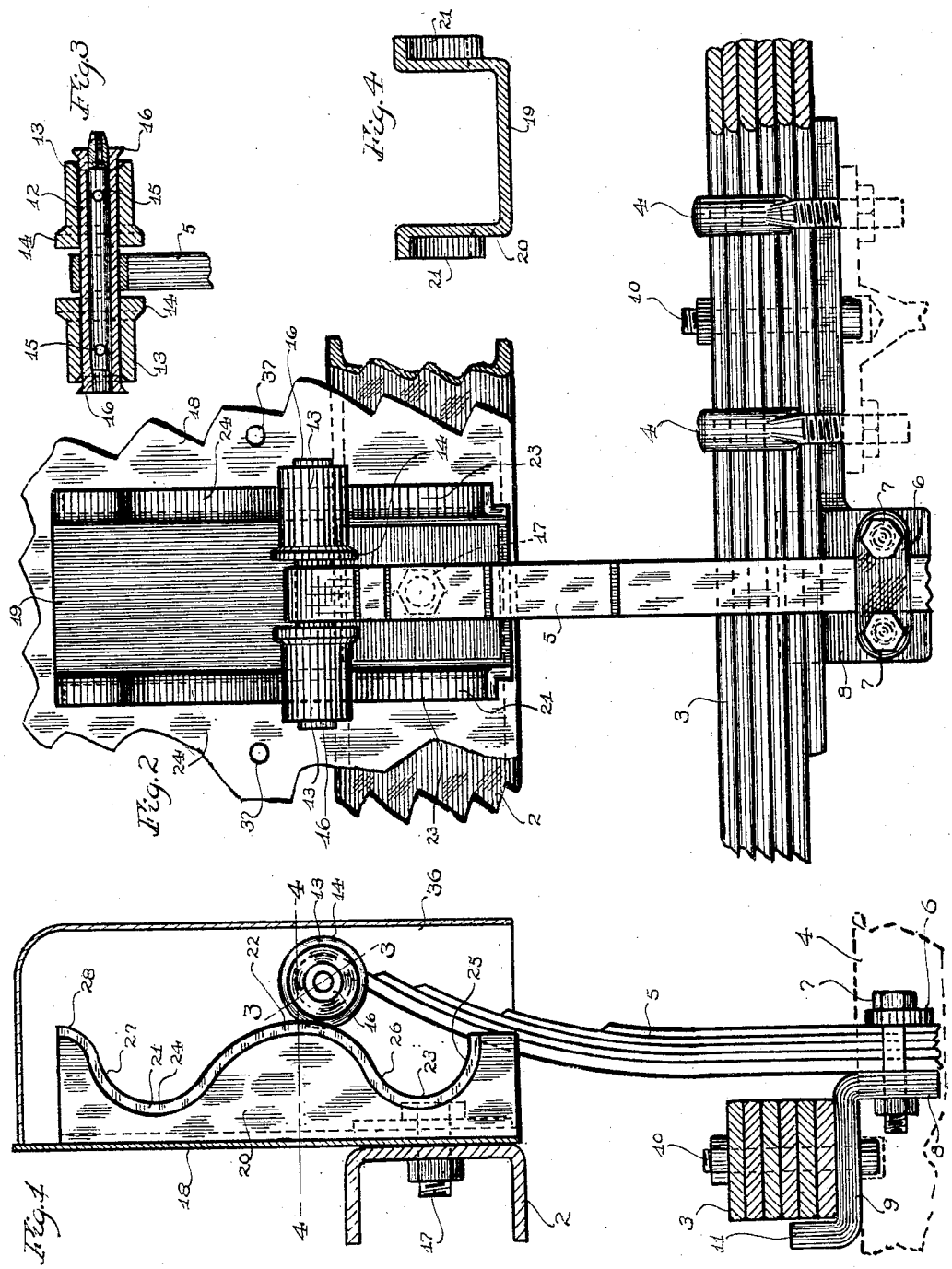
INVENTOR
George H. Taber
By [signature]
his Attorney

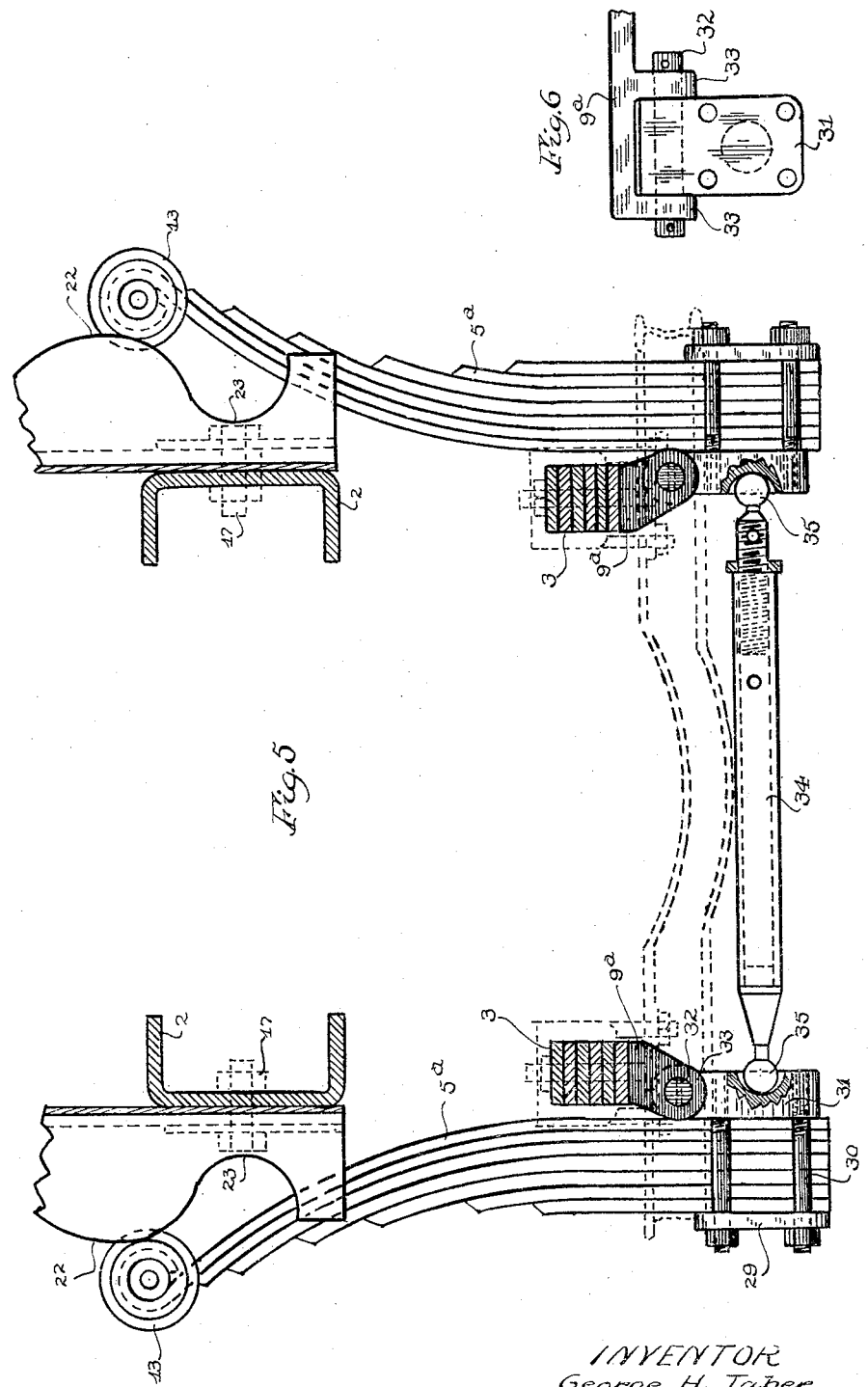

Patented Feb. 14, 1933

1,897,538

UNITED STATES PATENT OFFICE

GEORGE H. TABER, OF BINGHAMTON, NEW YORK

VEHICLE SPRING CONTROLLING MEANS

Application filed February 17, 1930. Serial No. 429,018.

The present invention relates to a vehicle spring controlling means, and an object of the invention is to provide a novel means which will confine substantially all of the relative movement between the axles and the frame to the axles and wheels so that the frame or body of the vehicle will travel along in an even plane with a minimum amount of vibration. Another object of the invention is to provide in connection with the spring suspension of a vehicle, a novel means which when the spring suspension spreads as the wheels enter a depression will assist the spring suspension to confine substantially all of the relative movement between the axle and the frame to the axle, and which when the suspension is compressed on the wheels striking a projection will assist the spring suspension to confine substantially all of the relative movement between the frame and the axle to the axle. Still another object of the invention is to resist the striking of the frame and the axle at the inner limit of the relative movement between the frame and the axle. A further object of the invention is to prevent too great a separation between the frame and the axle tending to cause a breaking of the spring suspension. A still further object of the invention is to provide a construction in which the opportunity for rattles is substantially eliminated. Still another and further object is to reduce the number of parts to a minimum. Still another and further object of the invention is to provide a power device controlled by empirically formed cam which will cause the power device to assist the spring suspension to confine the relative movement between the frame and the axle to the axle once such movement is started from a normal position. Another and further object of the invention is to provide an equalizing connection between two spring controlling devices on opposite sides of the vehicle so that the lateral pressure and action of the controlling devices on the vehicle frame will be equalized.

To these and other ends, the invention consists of certain parts and combinations of parts all of which will be hereinafter described: the novel features being pointed out in the appended claims.

In the drawings:

Fig. 1 is a fragmentary view of a vehicle showing one of the spring controlling devices in side elevation;

Fig. 2 is a similar view showing one of the spring controlling devices from another side;

Fig. 3 is a section on the line 3—3, Fig. 1;

Fig. 4 is a section on the line 4—4, Fig. 1;

Fig. 5 is a view showing two of the spring controlling devices on opposite sides of a vehicle, with an equalizing connection between them; and Fig. 6 is a detail view of an attaching bracket for the power device illustrated in Fig. 5.

In the embodiment of the invention illustrated in Figs. 1 to 4 inclusive, 1 indicates a fragment of an axle and 2 indicates a fragment of a frame of a vehicle. The frame is supported by the axle by means of a spring suspension indicated fragmentarily at 3, as is common in the art, the spring suspension illustrated being of semieliptical type and being held to the axle 1 by spring clips 4.

The control for the spring or spring suspension of a vehicle, in the present embodiment, employs four controlling devices two between the rear axle and the frame or body, and two between the front axle and the frame of the body, one adjacent each wheel. It is apparent however that it is not necessary to use four of such devices as two only may be employed on a vehicle for either the front or rear axle.

Each spring controlling device embodies a power element, in this instance, in the form of a spring arm or leaf spring 5 formed of a number of leaves or laminated and supported by one of the first two named parts, to wit: the axle 1 and the frame 2.

In the embodiment illustrated in Figs. 1 to 4, this spring is rigidly secured to the axle and to this end has its lower end held by a clamp 6 secured by bolts 7 to a downwardly turned portion 8 on an attaching plate 9 by which it is secured between the spring 3 and the axle 1 by means of the spring clips 4 and the usual spring center bolt 10. This attaching or anchoring member 9 may also have an upwardly turned portion 11 for cooperating with that side face of the spring 3 opposite the side on which the leaf spring is arranged, the leaf spring, in this instance, being arranged on the outer side of the vehicle spring 3 and projecting upwardly above the underside of the frame 2. In this instance, this leaf spring carries in its upper end a pin or stationary shaft 12 which is projected from opposite sides of the spring and acts as a bearing for two rollers 13 which at their inner sides are provided with flanges 14. The pin or shaft 13 may be made hollow in order to contain a lubricant which is fed to the rollers through lateral ports 15. The ends of the hollow shaft may be flanged at 16 after the rollers have been fitted thereon to hold the rollers on the shaft.

The rollers on the upper end of each power spring cooperate with a cam device mounted, in this instance, on one of the parts 1 and 2 opposite the one carrying the power spring 5, in this instance, the frame 2. This cam device, in this instance, is bolted to the frame 2 by a bolt 17 so that it lies on the outer face of the frame preferably next to the splasher plate 18 of the fender. The cam device as illustrated embodies a plate 19 having side pieces 20 projected therefrom, the side pieces being formed at their free edges with cammed surfaces formed by turning the edges of the side pieces outwardly at 21 to provide wide bearing surfaces. With these cam surfaces cooperate the rollers or anti-friction devices 13, the spring arm 5 operating between the two sides of the cam member and having sufficient space on opposite sides thereof to give clearance for lateral play due to the action of the spring suspension. The flanges 14 serve to confine the rollers to the cam surfaces during such lateral movement.

The cam device is so formed that it causes the upper end of the spring arm 5 to travel in a curved line on the frame 2 and to this end, the cam has a high point 22 and two low points 23 and 24 one below the high point and the other above the high point. When the vehicle frame 2 is in normal position with reference to the axle 1, the rollers 13 engage substantially at the high point of the cam, so that the spring 5 is under substantially maximum deflection with the energy stored therein. In the drawings, the rollers 13 engage the cam slightly below the high point when the frame and the axle are in normal position, as this will tend to maintain a supporting pressure which holds the frame in an elevated or normal position with a slight resistance so that the power spring acts as an additional support for the body. This curve is not a true arc of a circle but is empirically formed because it has been found that a true arc does not meet the requirements to as great a nicety as does a curve that has been formed empirically. The shape of the curve depends on the normal weight of the body, the power of the spring control or power device and the desired results to be obtained. It is apparent that, when a wheel of the vehicle starts to enter a depression, the axle will follow the wheel, and, as the power device 5 is acting on the roller 13 which cooperates with the cam, the tendency is to force the roller 13 down the underside of the curve of the cam toward the low point 23. This retards the descent of the body and increases the movement of the wheel into the depression. In other words, the power spring assists the spring suspension in the rapidity of this action and has sufficient power to support the body against material descent so that the greater the speed of the vehicle, the greater is this effect. On the other hand, after the wheel of the vehicle has struck a projection, the movement of the axle relatively to the body carries the rollers 13 down the upper part of the curve of the cam and tends to lift the wheel over said obstruction and, at the same time, weakening the action of the vehicle spring suspension and the tendency to lift the body because of the compressed power stored up in the spring suspension due to the striking of the projection by the wheel. Furthermore, the speed of the upward movement of the frame is reduced and this action becomes more effective with the increased speed of the vehicle.

With the end in view of preventing separation between the cam and the rollers 13 upon the relative movement of the axle and the frame away from each other, and, at the same time, to prevent extreme separation of the frame and the axle while providing a retarded final separation, the cam has a curved extension 25 beyond its low point 23 which projects toward the vertical plane of the high point 22 and has its end portion substantially horizontally arranged at right angles to the line of movement between the frame and the axle. The radius of this curve is slightly greater than the radius of the roller so that after the rollers reach the low point 23 their further movement is retarded by the curved portion but this retardation is not in the form of a shock or jar but is gradual due to the form of the curve. On the return movement of the rollers, they ride toward the high point on a curve 26 which has a greater radius than the radius of the rollers 13 so that the parts return to normal without any shock, jar or noise.

Means is provided on the cam for causing the spring power device to act to prevent the frame and the axle being brought into abutment. This is accomplished by providing a curved surface 27 extending from the low point 24 toward the plane of the high point 22. This curved surface also has a radius slightly greater than the radius of the roller 13 so that while the rollers roll over the surface, this surface acts as a retarder of the relative movement of the frame and the axle toward each other. Beyond this curved surface 27 is a reversely curved surface 28 which has a portion substantially in the vertical plane of the high point 22 and which permits the roller to continue movement beyond the retarding curve 27 without coming to a sudden stop.

The embodiment of the invention shown in Figs. 5 and 6 is substantially identical to that shown in Figs. 1 to 4 except that the springs 5ª are made heavier, and are secured by a clamping plate 29 by studs 30 to a swinging support 31 which is pivoted on a pin 32 supported by two ears 33 projected downwardly from a plate 9ª which is held in the same manner as the plate 9 of the other embodiment. In this construction, the two spring arms 5ª on opposite sides of the vehicle have an equalizing connection between them in the form of an adjustable bar 34 which has at its opposite ends ball and socket connections 35 with the swinging members 31, the bar being adjustable in order to increase and decrease the power of the springs 5ª.

It is apparent that with this construction, the two spring arms 5ª exert pressure in opposite directions on the vehicle frame 2 transversely of the longitudinal axis of the vehicle and that the connection between the two spring arms equalizes this pressure. As a result both sides of the vehicle are uniformly controlled.

If desired the cam and the free end of the leaf spring may be enclosed and to this end a box like cover 36 may be employed for each controlling device covering the top and sides of the controlling device and secured by bolts to the fender splasher 18 through the holes 37.

According to this invention, a controller for the spring suspension of a vehicle has been provided which is substantially free from friction. This controller is so constructed that it has a minimum number of parts and joints and is substantially free from noises so that it requires on expert attention and does not easily get out of adjustment. A power member as a spring with energy stored therein has an anti-friction connection with a cam to effect the control. The cam is empirically formed so as to meet actual conditions. The power device cooperates with the cam in such a manner and degree that it is substantially inactive on the spring suspension when the axle is substantially in normal position, and becomes effective when the axle is away from normal position. The power device assists the spring suspension to expand and also assists the spring suspension to compress so that the movement of the frame with reference to the roadway is reduced to a minimum. The power device after assisting the spring suspension in expanding or compressing acts to limit the expansion and compression without producing any jars, shocks or noise. On the compression movement, the power device after assisting the spring suspension to the desired degree, then works conjointly with the spring suspension to resist the upward movement of the axle to resist striking of the frame by the axle.

What I claim as my invention and desire to secure by Letters Patent is:

1. The combination with a frame, an axle, and a spring arranged between the axle and the frame, of a spring and roller power element in which energy is stored, and a cam over which said roller travels on the relative movement between the frame and the axle, said cam having a high point below which the roller engages when the frame and axle are substantially at normal positions, and low points on opposite sides of the high point to which the roller moves upon relative movement of the frame and the axle in either direction from normal position, and high points beyond the lower points to which the roller moves after a desired relative movement is reached to cause energy to be stored in the power element to resist the further relative movement.

2. The combination with a frame, an axle, and means resiliently supporting the frame on the axle in a normal position, of two spring members carried by one of the first two named parts and arranged to produce pressure on the other of said parts in opposite directions transversely of the longitudinal axis of the frame, and means carried by the other of said parts and guiding the two spring members on said part, each for movement in a curved line on said part, the spring member substantially occupying the high point of the curve when the frame is in normal position with reference to the axle, and an equalizing connection between said spring members for equalizing the control of said members.

3. The combination with a frame, an axle, and means resiliently supporting the frame on the axle, in a normal position, of two spring members pivotally supported by one of said first two named parts and arranged to produce pressure on the other of said parts in opposite directions transversely of the longitudinal axis of the frame, means carried by the other of said parts and guiding the two spring members each for movement in a curved line on said part, the spring member substantially occupying the high point of the curve when the frame is in normal position with reference to the axle, and an equalizing member between the pivoted spring members for equalizing the control of said members.

4. The combination with a frame, an axle, and means resiliently supporting the frame on the axle, of a spring arm pivotally mounted on one of said first two named parts, means carried by the other of such parts and guiding the free end of the spring arm for movement on such part in a curved line, the free end of the spring arm substantially occupying the high point of the curve when the frame is in normal position on the axle, and means for adjusting the spring arm on its pivot to vary the power of the spring member.

GEORGE H. TABER.